United States Patent [19]
Nakamura

[11] Patent Number: 5,407,147
[45] Date of Patent: Apr. 18, 1995

[54] FILM WINDING/REWINDING DEVICE
[75] Inventor: Ikushi Nakamura, Sakai, Japan
[73] Assignee: Minolta Camera Kabushiki Kaisha, Osaka, Japan
[21] Appl. No.: 76,630
[22] Filed: Jun. 15, 1993
[30] Foreign Application Priority Data
   Jun. 18, 1992 [JP] Japan .................. 4-182928
[51] Int. Cl.⁶ .............................................. G03B 1/04
[52] U.S. Cl. ................................ 242/352; 79/665 H
[58] Field of Search ............... 242/71.6, 71.7, 210, 242/349, 352; 359/173.1, 212, 214; 74/665 G, 665 GD, 665 H

[56] References Cited
U.S. PATENT DOCUMENTS

| 3,598,033 | 8/1971 | Sasaki | 242/71.6 |
| 3,882,516 | 5/1975 | Ogiso et al. | 242/71 X |
| 3,981,022 | 9/1976 | Iwashita et al. | 354/171 |
| 3,999,197 | 12/1976 | Iwashita et al. | 354/173.1 |
| 4,294,527 | 10/1981 | Hashimoto et al. | 354/173.1 |
| 4,304,480 | 12/1981 | Fukahori et al. | 354/214 X |
| 4,306,794 | 12/1981 | Fukahori et al. | 354/214 X |
| 4,419,000 | 12/1983 | Yoshida et al. | 354/173.1 |

Primary Examiner—Daniel P. Stodola
Assistant Examiner—John P. Darling
Attorney, Agent, or Firm—Burns, Doane, Swecker & Mathis

[57] ABSTRACT

A film winding/rewinding device has a power transmitting shaft extended between the film spool chamber and the film cartridge chamber of the camera. The rotation of the output shaft of a motor disposed with the axis of the output shaft perpendicular to the axis of the power transmission shaft is transmitted by a first worm gearing to the power transmission shaft. When winding the film held on the film holding spool of a film cartridge, the rotation of the output shaft of the motor in the normal direction is transmitted to a film winding spool by a second worm gearing connected to the power transmitting shaft to wind the film. When winding the film, any power is not transmitted to a film rewinding fork disposed within the film cartridge chamber. When rewinding the film, the rotation of the output shaft of the motor in the reverse direction is transmitted to the film rewinding fork disposed within the film cartridge chamber by a third worm gearing connected to the power transmission shaft to rewind the film.

5 Claims, 3 Drawing Sheets

FILM WINDING/REWINDING DEVICE

BACKGROUND OF THE INVENTION

1. Field of the Invention

The present invention relates to a film winding/rewinding device capable of being driven by a single built-in motor for both winding the film and rewinding the film.

2. Description of the Related Art

A conventional film winding/rewinding device for a camera, in general, is provided with a transmission mechanism comprising a train of a plurality of spur gears to drive a film winding spool and a rewinding fork.

Referring to FIG. 3 showing a typical film winding/rewinding device, a motor 101 is placed in a hollow film winding spool 121, and a transmission gearing is formed on the bottom wall of the camera body. The transmission gearing comprises a pinion 103 fixed to the output shaft 102 of the motor 101, a train of spur gears 104 to 108, a clutch CL comprising a swing plate 110 and gears 109 and 111, and a train of spur gears 112 to 116. A spur gear 108b coaxial with the spur gear 108 is in mesh with a spur gear 125 formed at one end of the film winding spool 121 to drive the film winding spool 121. The spur gear 116 is fixed to a rewinding fork 117 with which the shaft of a film cartridge engages.

When winding the film, the output shaft 102 of the motor 101 is rotated in the normal direction, i.e., a film winding direction, and the gear 109 rotates in the film winding direction. Then, the swing plate 110 of the clutch CL is turned in the direction of the arrow a about the axis of the gear 109 to disengage the gear 111 from the gear 112. Consequently, the rewinding fork 117 is disconnected from the motor 101 and only the film winding spool 121 is driven to wind the film. When rewinding the film, the output shaft 102 of the motor 101 is rotated in the reverse direction, i.e., a film rewinding direction. Then, the swing plate 110 of the clutch CL is returned to a position shown in FIG. 3 to bring the gear 111 into engagement with the gear 112, so that power is transmitted to the rewinding fork 117 for rewinding operation. During the rewinding operation, the film winding spool 121 is rotated in the reverse direction to loosen the film tightly wound on the film winding spool 121.

With recent increasing request for the miniaturization and weight reduction of the camera, a new film winding/rewinding device has been required, because the conventional film winding/rewinding device comprising a train of spur gears needs a comparatively large number of parts which is disadvantageous for the miniaturization and weight reduction of the camera.

Furthermore, recent development of magnetic materials and improvements in the construction of the motor have enabled the development of a miniaturized motor far smaller than the conventional motor and capable of being placed within the film winding spool and the effective use of the internal space of the camera body. However, since the length of the motor is small as compared with the length of the film winding spool, an unutilized space, such as vacant space 122 shown in FIG. 3, remains in the limited internal space of the camera body. When the motor is placed within the film winding spool, the outside diameter of the motor is limited by the inside diameter of the film winding spool and hence only limited motors are available.

SUMMARY OF THE INVENTION

Accordingly, it is a principal object of the present invention to provide a novel film winding/rewinding device capable of efficiently using the limited internal space of the apparatus such as a camera body.

Another object of the present invention is to provide a novel film winding/rewinding device comprising a comparatively small number of parts and facilitating the miniaturization and weight reduction.

The above and other objects, features and advantages of the present invention will become more apparent from the following description taken in connection with the accompanying drawings.

DETAILED DESCRIPTION OF THE PREFERRED EMBODIMENTS

Figure 1:
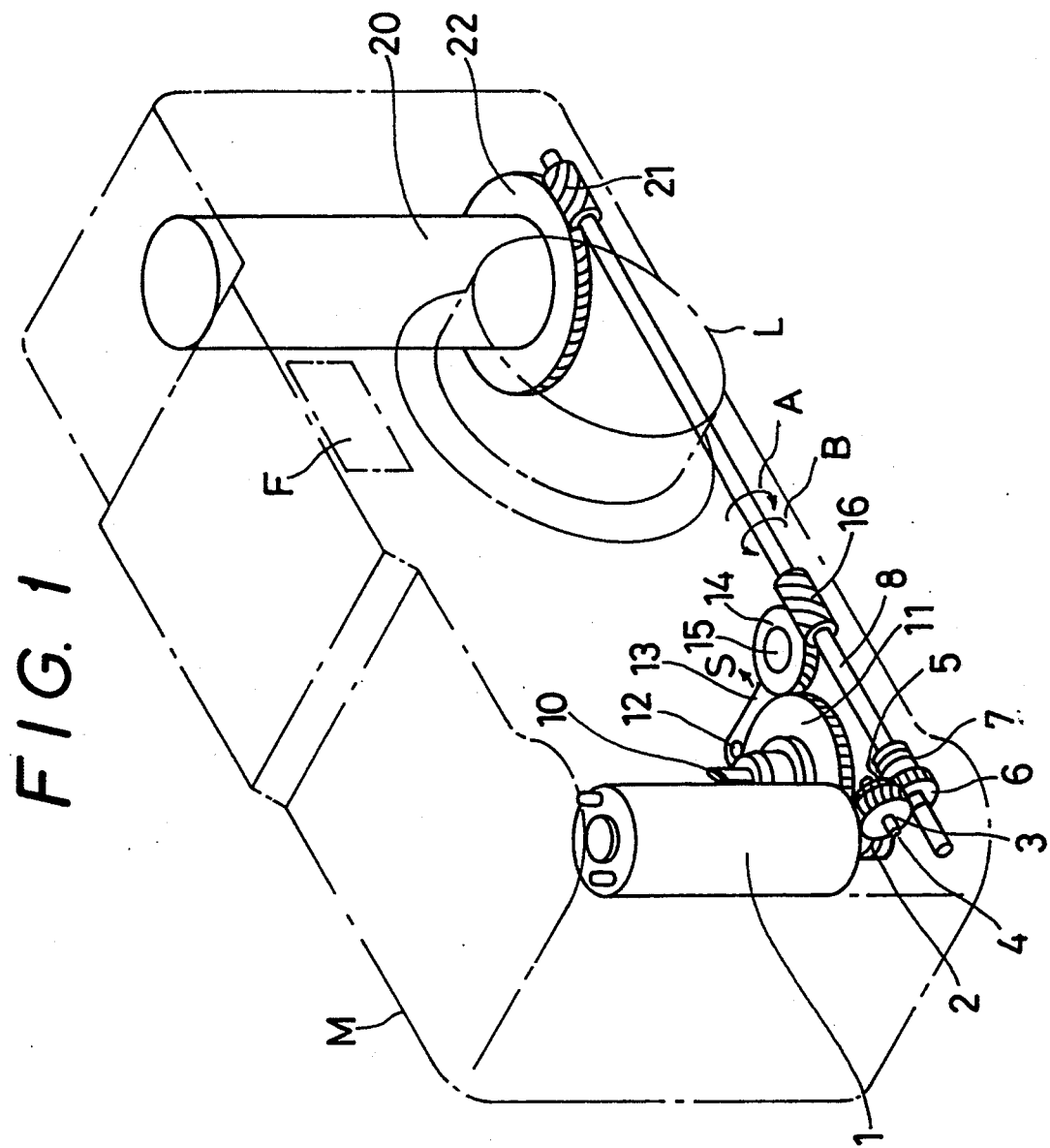
FIG. 1 is a perspective view of a film winding/rewinding device in a first embodiment according to the present invention.

Referring to FIG. 1 showing a film winding/rewinding device adapted to a camera, in a first embodiment according to the present invention, a motor 1 is attached to a camera body M indicated by alternate long and short dash line by well-known means, a worm 2 is fixed to the output shaft of the motor 1, and a worm wheel 3 fixedly supported on an intermediate shaft 4 is in mesh with the worm 2. The worm 2 and the worm wheel 3 form a worm gearing. In FIG. 1, denoted by L is a lens unit and by F is a viewfinder.

A spur gear 5 is fixedly mounted on the intermediate shaft 4 fixedly supporting the worm wheel 3 so that the worm wheel 3 and the spur gear 5 rotate in one body. The spur gear 5 is in mesh with a spur gear 6 rotatably supported on a driving shaft 8.

The driving shaft 8 is extended in the front lower portion of the interior of the camera body M between a film winding spool chamber and a film cartridge chamber and is supported for rotation on the camera body M by well-known means. The motor 1 is disposed perpendicularly to the driving shaft 8. A worm 16 for transmitting power to a rewinding fork 10, and a worm 21 for transmitting power to a film winding spool 20 are fixed to the driving shaft 8. The spur gear 6 supported for free rotation on the driving shaft 8 is connected by a clutch 7 to the driving shaft 8. The clutch 7 is of a well-known friction type. Normally, the clutch 7 is engaged to connect the spur gear 6 operatively to the driving shaft 8. The rotation of the output shaft of the motor 1 disposed with its axis extended perpendicularly to the driving shaft 8 is transmitted through the worm 2, the worm wheel 3, the spur gear 5, the spur gear 6 and the clutch 7 to the driving shaft 8.

The rewinding fork 10 engages with one end of the shaft of a film cartridge, not shown, loaded in the camera. A fork gear 11 is fixed coaxially to the rewinding fork 10 and supported for rotation by a shaft, not shown, on the camera body M.

A swing plate 13 is supported for swing motion on a shaft 12, and a worm wheel 14 is supported for rotation by a shaft 15 on the free end of the swing plate 13. The worm wheel 14 brought into engagement with both the worm 16 fixed to the driving shaft 8 and the fork gear 11.

When winding the film, the driving shaft 8 is rotated in the direction of A shown in FIG. 1, the thread of the worm 16 advances in a direction to move the worm wheel 14 supported on the swing plate 13 in a direction to separate from the fork gear 11, the swing plate 13 swings in a direction of arrow S to separate the worm wheel 14 from the fork gear 11 and, consequently, the driving force of the driving shaft 8 is not transmitted to the rewinding fork 10. When rewinding the film, the driving shaft 8 is rotated in the direction of B shown in FIG. 1, the thread of the worm 16 advances in a direction to bring the worm wheel 14 supported on the swing plate 13 into engagement with the fork gear 11 as shown in FIG. 1 and, consequently, the driving force of the driving shaft 8 is transmitted through the worm 16, the worm wheel 14 and the fork gear 11 to the rewinding fork 10.

The film winding spool 20 is supported for rotation by supporting means, not shown, on the camera body M. A spool worm gear 22 is fixed coaxially to the film winding spool 20 in mesh with the worm 21 fixed to the driving shaft 8. The rotation of the driving shaft 8 is transmitted through the worm 21 and the spool worm gear 22 to the spool 20.

A first function of the clutch 7 is making the spur gear 6 slip relative to the driving shaft 8 to protect the motor 1 and the gearing from damages when the film winding-/rewinding device is loaded excessively during film winding operation. A second function of the clutch 7 is disconnecting the driving shaft 8 from the motor 1 and the gearing to protect the motor 1 and the gearing from damages when taking out the film from the camera by rotating the film winding spool 20 in the reverse direction by pulling the film by hand to unwind the film from the film winding spool 20 in case an accident occurs to the camera. The clutch may be formed between the film winding spool 20 and the spool worm wheel 22 for the second function. However, if the clutch is formed between the spool 20 and the spool worm wheel 22, the clutch must be such a clutch having a large frictional capacity and such a clutch is inevitably large in construction. Therefore, the clutch is formed on the driving shaft 8 in this embodiment.

The operation of the film winding/rewinding device will be described hereinafter.

Film Winding Operation

The output shaft of the motor 1 is rotated in the normal direction, i.e., a film winding direction, and the rotation of the output shaft of the motor 1 is transmitted through the worm 2, the worm wheel 3, the spur gear 5, the spur gear 6 and the clutch 7 to the driving shaft 8. The rotation of the driving shaft 8 in the film winding direction (direction A) is transmitted through the worm 21 and the spool worm wheel 22 to the film winding spool 20 to rotate the film winding spool 20 in a film winding direction, to wind the film. The worm 16 fixed to the driving shaft 8 rotates in a direction so that the thread of the worm 16 advances in a direction to separate the worm wheel 14 supported on the swing plate 13 from the fork gear 11. Consequently, the worm wheel 14 is disengaged from the fork wheel 11 and the rotation of the driving wheel in the film winding direction is not transmitted to the rewinding fork 10.

Protective Operation

After all the available frames of the film have been exposed, the film cannot be wound any further and winding load increases greatly. Then, the clutch 7 disengages the driving shaft 8 from the motor 1 to protect the motor 1, the gearing and the film from damages.

The last frame of the film can be detected by, for example, a photoelectric detector. Light is projected on a perforated portion of the film and the light reflected by the film is detected by the photoelectric detector. When the reflected light detected by the photoelectric detector does not vary, it is decided that the film cannot be wound any further. Then, a control system reverses the motor 1 after a predetermined time after the detection of the end of the film to start rewinding the film.

Film Rewinding Operation

The output shaft of the motor 1 is rotated in the reverse direction, i.e., a film rewinding direction, and the rotation of the output shaft of the motor 1 is transmitted through the worm 2, the worm wheel 3, the spur gear 5, the spur gear 6 and the clutch 7 to the driving shaft 8 in the film rewinding direction (direction B). Then, the thread of the worm 16 advances in a direction to bring the worm wheel 14 supported on the swing plate 13 into engagement with the fork gear 11 and, consequently, the rotation of the output shaft of the motor 1 in the film rewinding direction is transmitted through the worm 16, the worm wheel 14 and the fork gear 11 to the rewinding fork 10 to rewind the film. At the same time, the rotation of the driving shaft 8 in the film rewinding direction is transmitted through the worm 21 and the spool worm wheel 22 to the film winding spool 20 to rotate the same in the reverse direction. Since the number of teeth of the spool worm wheel 22 is determined so that the rotating speed of the film winding spool 20 is higher than that of the rewinding fork 10, the film is slackened by the reverse rotation of the film winding spool 20. As is generally known, the leading end of the film is connected frictionally or with a unidirectional fastener to the film winding spool 20. Therefore, the film separates from the film winding spool 20 when the film is slackened to some extent by the reverse rotation of the film winding spool 20, so that the film can be rewound smoothly.

Figure 2:
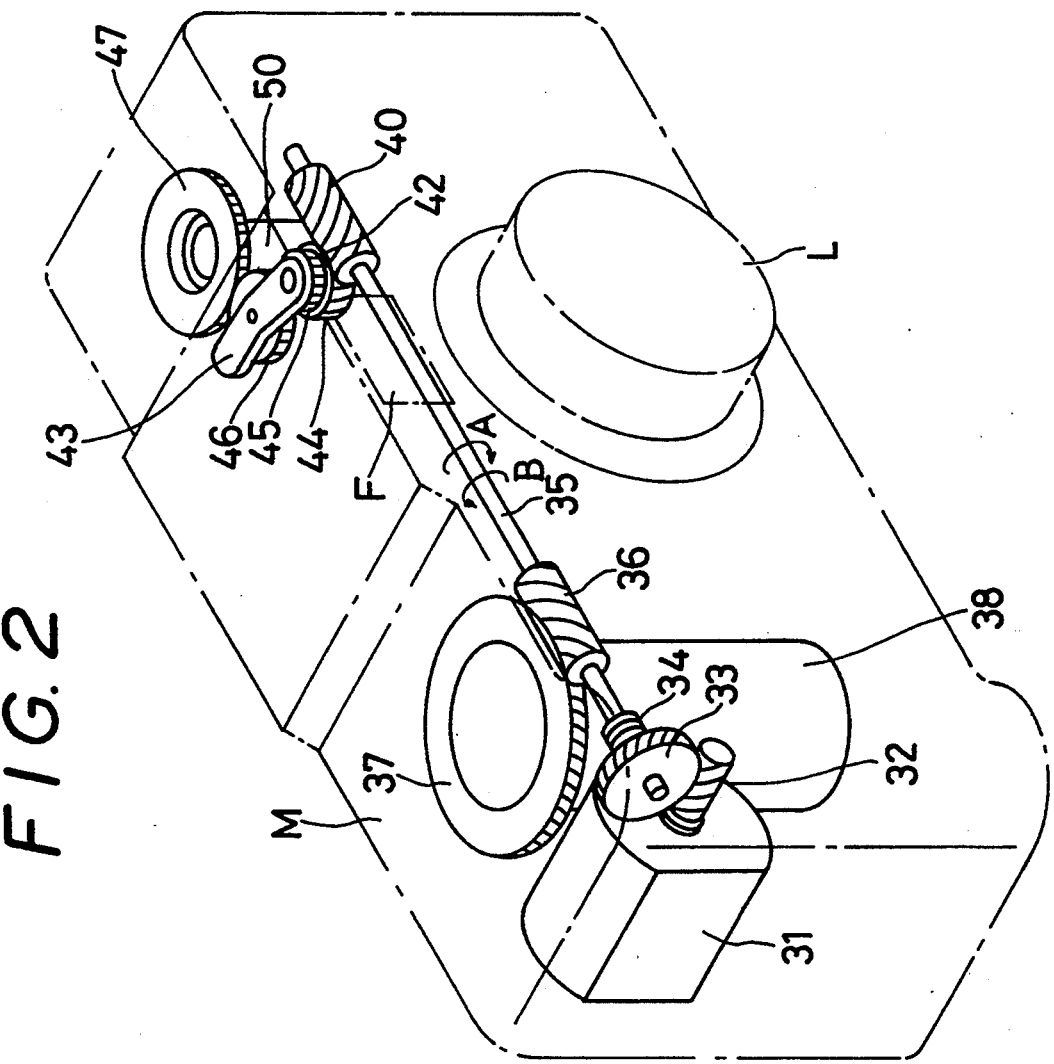
FIG. 2 is a perspective view of a film winding/rewinding device in a second embodiment according to the present invention.
Figure 3:
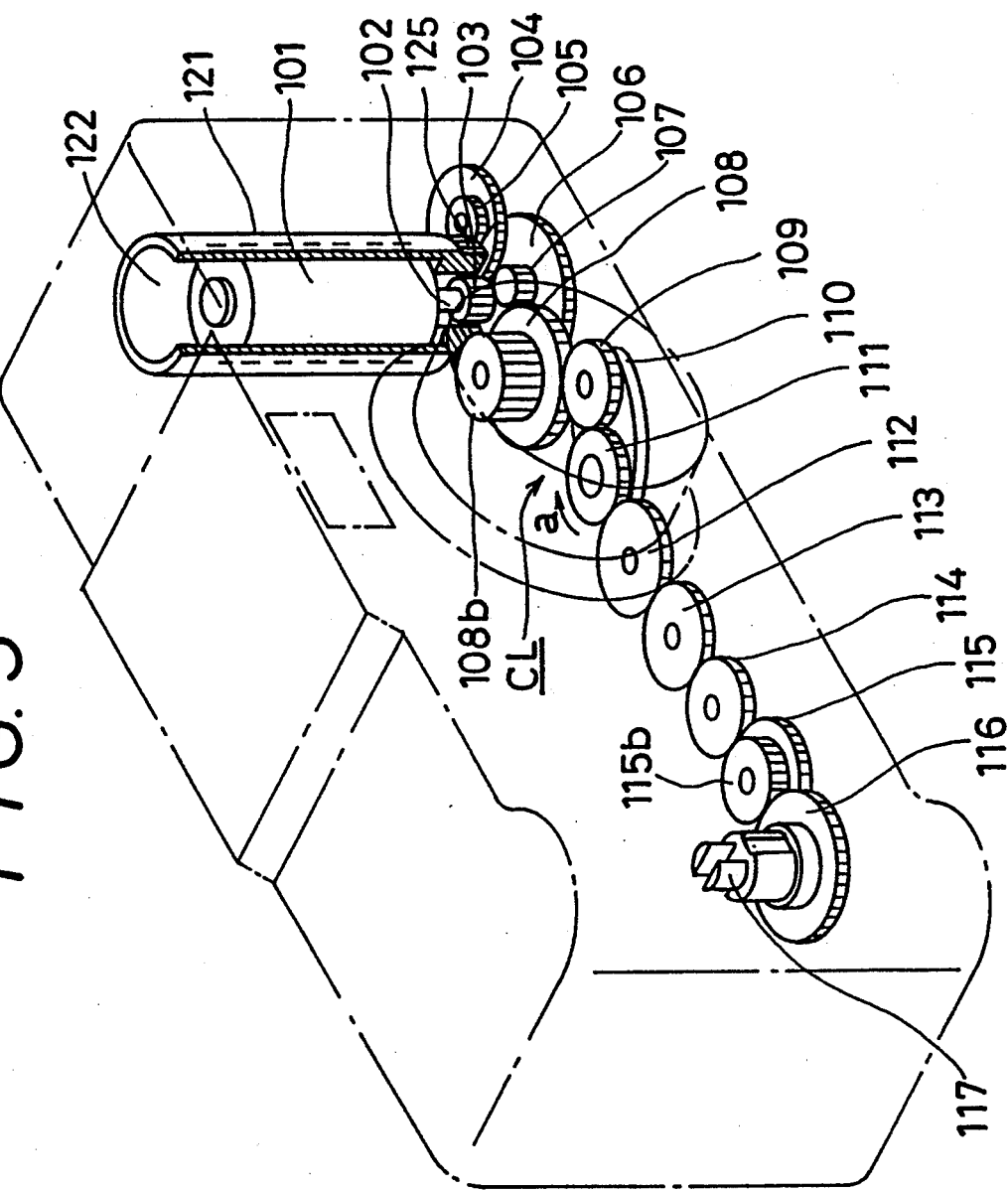
FIG. 3 is a conventional film winding/rewinding device for a camera.

FIG. 2 shows a film winding/rewinding device in a second embodiment according to the present invention. The principal difference of the film winding/rewinding device in the second embodiment from the first embodiment is that a driving shaft is extended in the front upper portion of the interior of a camera body M and a motor is disposed with its output shaft extending horizontally.

Referring to FIG. 2, there are shown the motor 31, a film winding spool 38, a spool worm wheel 37 coaxially attached to one end of the film winding spool 38, a film rewinding fork 50, a fork gear 47 attached coaxially to the rewinding fork 50, a driving shaft 35 extended in the front upper portion of the interior of the camera body M, a lens unit L and a viewfinder F.

A worm 32 is fixed to the output shaft of the motor 31, and a worm wheel 33 is engaged with the worm 32. Normally, the worm wheel 33 is operatively connected to the driving shaft 35 by a clutch 34 to transmit the rotation of the output shaft of the motor 31 to the driving shaft 35. If the driving shaft 35 is overloaded, the clutch 34 disengages the driving shaft 35 from the motor 31.

Worms 36 and 40 are fixed to the driving shaft 35. The rotation of the driving shaft 35 in a film winding direction (direction A) is transmitted through the worm 36 and the spool worm wheel 37 to the film winding spool 38. At the same time, the rotation of the worm 40 is transmitted through a worm wheel 44 and a gear 45, which are supported on a swing plate 43, to a gear 46. However, since the thread of the worm 40 advances in a direction to turn the swing plate 43 which is pivotally mounted on a shaft 42 in a counterclockwise direction as viewed in FIG. 2, i.e., a direction to disengage the gear 46 and the fork gear 47, the rotation of the driving shaft 35 is not transmitted to the rewinding fork 50.

When the driving shaft 35 is rotated in a film rewinding direction, the thread of the worm 40 advances in a direction to turn the swing plate 43 in a clockwise direction as viewed in FIG. 2, i.e., a direction to bring the gear 46 into engagement with the fork gear 47, the rotation of the driving shaft 35 is transmitted through the worm 40, the worm wheel 44, the gears 45 and 46 and the fork gear 47 to the rewinding fork 50.

As is apparent from the foregoing description, in a film winding/rewinding device in accordance with the present invention, a single driving shaft is extended between the film spool chamber and the film cartridge chamber of the camera body of a camera, a first worm gearing is placed between the driving shaft and a film winding spool, and a second worm gearing is placed between the driving shaft and a film rewinding shaft, the film winding/rewinding device needs a comparatively small number of parts and can be formed in a comparatively narrow space, which contributes to the miniaturization and weight reduction of the camera. Since the motor used for the film winding/rewinding device is disposed outside the film winding spool, the size of the motor is not limited by the size of the film winding spool. The use of the internal space of the film winding spool for accommodating large components of the camera, such as the capacitor of a photoflash unit and the like will enable the further miniaturization of the camera.

What is claimed is:

1. A film winding/rewinding device to pull out a film from a film cartridge provided with a film holding spool, said film winding/rewinding device comprising:
   film winding spool to wind the film pulled out from the film cartridge;
   a film rewinding shaft to be engaged with the film holding spool of the film cartridge to rewind the film;
   a power transmitting shaft extended with its axis perpendicular to both the respective axes of said film winding spool and said film rewinding shaft;
   a motor disposed with the axis of its output shaft perpendicular to the axis of said power transmitting shaft;
   a motor power transmitting mechanism which comprises a first worm gear for transmitting the driving power from said motor to said power transmitting shaft;
   a first power transmitting mechanism which transmits the driving power from said power transmitting shaft to said film winding spool; and
   a second power transmitting mechanism which transmits the driving power from said power transmitting shaft to said film rewinding shaft.

2. A film winding/rewinding device to pull out a film from a film cartridge provided with a film holding spool, said film winding/rewinding device comprising:
   a film winding spool to wind the film pulled out from the film cartridge;
   a film rewinding shaft to be engaged with the film holding spool of the film cartridge to rewind the film;
   a power transmitting shaft extended with its axis perpendicular to both the respective axes of said film winding spool and said film rewinding shaft;
   a motor disposed with the axis of its output shaft perpendicular to the axis of said power transmitting shaft; and
   a motor power transmitting mechanism which comprises a first worm gear for transmitting the driving power from said motor to said power transmitting shaft.

3. A film winding/rewinding device to pull out a film from a film cartridge provided with a film holding spool, said film winding/rewinding device comprising:
   a film winding spool to wind the film pulled out from the film cartridge;
   a film rewinding shaft to be engaged with the film holding spool of the film cartridge to rewind the film;
   a power transmitting shaft extended with its axis perpendicular to both the respective axes of said film winding spool and said film rewinding shaft;
   a motor disposed with the axis of its output shaft perpendicular to the axis of said power transmitting shaft;
   a motor power transmitting means comprising a first worm gear for transmitting the driving power from said motor to said power transmitting shaft;
   a first power transmitting means comprising a second worm gear for transmitting the driving power from said power transmitting shaft to said film winding spool; and
   a second power transmitting means comprising a third worm gear for transmitting the driving power from said power transmitting shaft to said film rewinding shaft.

4. A film winding/rewinding device to pull a film from a film cartridge provided with a film holding spool, said film winding/rewinding device comprising:
   a film winding spool to wind the film pulled out from the film cartridge;
   a film rewinding shaft to be engaged with the film holding spool of the film cartridge to rewind the film;
   a power transmitting shaft extended with its axis perpendicular to both the respective axes of said film winding spool and said film rewinding shaft;
   a motor disposed with the axis of its output shaft perpendicular to the axis of said power transmitting shaft;
   a motor power transmitting mechanism which comprises a first worm gear for transmitting the driving power from said motor to said power transmitting shaft;
   a first power transmitting mechanism which comprises a second worm gear for transmitting the driving power from said power transmitting shaft to said film winding spool; and
   a second power transmitting mechanism which transmits the driving power from said power transmitting shaft to said film rewinding shaft.

5. A film winding/rewinding device to pull a film from a film cartridge provided with a film holding spool, said film winding/rewinding device comprising:
- a film winding spool to wind the film pulled out from the film cartridge;
- a film rewinding shaft to be engaged with the film holding spool of the film cartridge to rewind the film;
- a power transmitting shaft extended with its axis perpendicular to both the respective axes of said film winding spool and said film rewinding shaft;
- a motor disposed with the axis of its output shaft perpendicular to the axis of said power transmitting shaft;
- a motor power transmitting mechanism which comprises a first worm gear for transmitting the driving power from said motor to said power transmitting shaft;
- a first power transmitting mechanism which comprises a second worm gear for transmitting the driving power from said power transmitting shaft to said film winding spool; and
- a second power transmitting mechanism which comprises a third worm gear for transmitting the driving power from said power transmitting shaft to said film rewinding shaft.

* * * * *